US012431275B2

(12) United States Patent
Kuo et al.

(10) Patent No.: US 12,431,275 B2
(45) Date of Patent: Sep. 30, 2025

(54) MULTIPHASE INDUCTOR STRUCTURE

(71) Applicant: ITG Electronics, Inc., New Taipei (TW)

(72) Inventors: Martin Kuo, New Taipei (TW); Nanhai Zhu, Shenzhen (CN)

(73) Assignee: ITG ELECTRONICS, INC., New Taipei (TW)

( * ) Notice: Subject to any disclaimer, the term of this patent is extended or adjusted under 35 U.S.C. 154(b) by 971 days.

(21) Appl. No.: 17/541,376

(22) Filed: Dec. 3, 2021

(65) Prior Publication Data

US 2023/0178287 A1 Jun. 8, 2023

(51) Int. Cl.
*H01F 27/28* (2006.01)
*H01F 27/24* (2006.01)
*H01F 27/29* (2006.01)

(52) U.S. Cl.
CPC ............ *H01F 27/24* (2013.01); *H01F 27/29* (2013.01)

(58) Field of Classification Search
CPC .... H01F 27/24; H01F 27/29; H01F 2017/048; H01F 17/04; H01F 27/292; H01F 27/306
USPC ............................................... 336/5, 221, 83
See application file for complete search history.

(56) References Cited

U.S. PATENT DOCUMENTS

| | | | | |
|---|---|---|---|---|
| 2017/0178784 A1* | 6/2017 | Janis | ....................... | H01F 27/28 |
| 2017/0178794 A1* | 6/2017 | Yan | ....................... | H01F 41/02 |
| 2019/0180910 A1* | 6/2019 | Kuo | ....................... | H01F 37/00 |
| 2019/0295765 A1* | 9/2019 | Yan | ....................... | H01F 27/306 |
| 2021/0358678 A1* | 11/2021 | Wang | ....................... | H01F 27/324 |

* cited by examiner

*Primary Examiner* — Shawki S Ismail
*Assistant Examiner* — Kazi S Hossain
(74) *Attorney, Agent, or Firm* — Li & Cai Intellectual Property (USA) Office

(57) ABSTRACT

A multiphase inductor structure is provided. The multiphase inductor structure includes a main magnetic core body, a plurality of secondary magnetic core bodies, a plurality of main coils, and a plurality of secondary coils. The main magnetic core body has a plurality of recesses. The secondary magnetic core body, the main coil, and the secondary coil are correspondingly disposed in the recess. The main coil is arranged between the main magnetic core body and a corresponding one of the secondary coils. The secondary coil is arranged between a corresponding one of the main coils and a corresponding one of the secondary magnetic core bodies. The main magnetic core body is coupled to the secondary magnetic core body, the main coil, and the secondary coil in each of the recesses to from an inductor, and the plurality of inductors are not coupled to each other.

9 Claims, 6 Drawing Sheets

MULTIPHASE INDUCTOR STRUCTURE

FIELD OF THE DISCLOSURE

The present disclosure relates to a multiphase inductor structure, and more particularly to a multiphase and uncoupled indicator structure in which an overall space used is reduced and a power density is increased.

BACKGROUND OF THE DISCLOSURE

Conventional multiphase and uncoupled inductors mainly include multiple ones of single inductor that are separated from each other, and a single structure including multiple inductors is rarely adopted. Multiple ones of the single inductor are usually mechanically bonded together to be assembled in the multiphase inductor, while an overall size of the multiphase inductor formed in such way is accordingly increased. Therefore, a coupling of the multiphase inductor to a circuit board occupies a certain area of the circuit board, and reduces the available area for other electronic components, which causes little benefit for reducing an overall volume and enhancing a power density.

Therefore, how to design a multiphase and uncoupled inductor in a single structure through a structural improvement so as to reduce the volume and enhance the power density has become one of important issues to be addressed in the related field.

SUMMARY OF THE DISCLOSURE

In response to the above-referenced technical inadequacies, the present disclosure provides a multiphase inductor structure.

In one aspect, the present disclosure provides a multiphase inductor structure, which includes a main magnetic core body, a plurality of secondary magnetic core bodies, a plurality of main coils, and a plurality of secondary coils. The main magnetic core body has a plurality of recesses, and a plurality of partition walls each are formed between corresponding two of the plurality of recesses. The plurality of secondary magnetic core bodies are respectively disposed in the plurality of recesses. The plurality of main coils are respectively disposed in the plurality of recesses and respectively correspond to the plurality of secondary magnetic core bodies. Each of the plurality of main coils is arranged between the main magnetic core body and a corresponding one of the plurality of secondary coils. Each of the plurality of main coils has a first end part and a second end part that extend in opposite directions, and the first end part and the second end part are exposed from the main magnetic core body. The plurality of secondary coils are respectively disposed in the plurality of recesses and respectively correspond to the plurality of main coils. Each of the plurality of secondary coils is arranged between a corresponding one of the plurality of main coils and a corresponding one of the plurality of secondary magnetic core bodies. Each of the plurality of secondary coils has a third end part and a fourth end part that extend in opposite directions, and the third end part and the fourth end part are exposed from the main magnetic core body. The main magnetic core body is coupled to a corresponding one of the plurality of secondary magnetic core bodies, a corresponding one of the plurality of main coils, and a corresponding one of the plurality of secondary coils in each of the plurality of recesses to from an inductor, and the plurality of inductors are not coupled to each other.

In certain embodiments, the multiphase inductor structure further includes at least one metal sheet for connecting two of the plurality of secondary coils that are adjacent to each other, and the at least one metal sheet connects the third end part of one of the two secondary coils that are adjacent to each other to the fourth end part of another one of the two secondary coils that are adjacent to each other.

In certain embodiments, the multiphase inductor structure further includes two first metal connectors and two second metal connectors that respectively correspond to the two first metal connectors, the two first metal connectors are respectively disposed at two bottoms of two side walls of the main magnetic core body that are opposite to each other, one of the two second metal connectors is used for connecting a corresponding one of the two first metal connectors to the third end part of an adjacent one of the plurality of secondary coils, and another one of the two second metal connectors is used for connecting another corresponding one of the two first metal connectors to the fourth end part of another adjacent one of the plurality of secondary coils.

In certain embodiments, a top surface of the main magnetic core body has a plurality of through holes, and the plurality of through holes respectively correspond to and are spatially communicated with the plurality of recesses.

In certain embodiments, each of the plurality of main coils is electrically insulated from the corresponding one of the plurality of secondary coils.

In certain embodiments, the main magnetic core body and any one of the plurality of secondary magnetic core bodies have a gap arranged therebetween, and an inductance value caused by each of the plurality of inductors of the multiphase inductor structure is adjusted by changing a size of the gap.

In certain embodiments, each of a bottom surface of the first end part of the main coil and a bottom surface of the second end part of the main coil projects from the main magnetic core body.

In certain embodiments, each of a bottom surface of the third end part of the secondary coil and a bottom surface of the fourth end part of the secondary coil is higher than each of a bottom surface of the first end part of the main coil and a bottom surface of the second end part of the main coil.

In certain embodiments, the first end part and the second end part of each of the plurality of main coils, and the third end part and the fourth end part of the corresponding one of the plurality of secondary coils are linearly arranged.

In certain embodiments, the first end part and the second end part of each of the plurality of main coils extend in directions away from each other, and the third end part and the fourth end part of each of the plurality of secondary coils extend in directions away from each other.

Therefore, in the multiphase inductor structure provided by the present disclosure, by virtue of "the plurality of main coils being respectively disposed in the plurality of recesses and respectively corresponding to the plurality of secondary magnetic core bodies, and the plurality of secondary coils being respectively disposed in the plurality of recesses and respectively corresponding to the plurality of main coils" and "the main magnetic core body being coupled to the corresponding one of the plurality of secondary magnetic core bodies, the corresponding one of the plurality of main coils, and the corresponding one of the plurality of secondary coils in each of the plurality of recesses to from the inductor, and the plurality of inductors being not coupled to each other," a multiphase inductor structure formed in a single structure is provided so as to achieve effects of reducing a volume and enhancing a power density.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
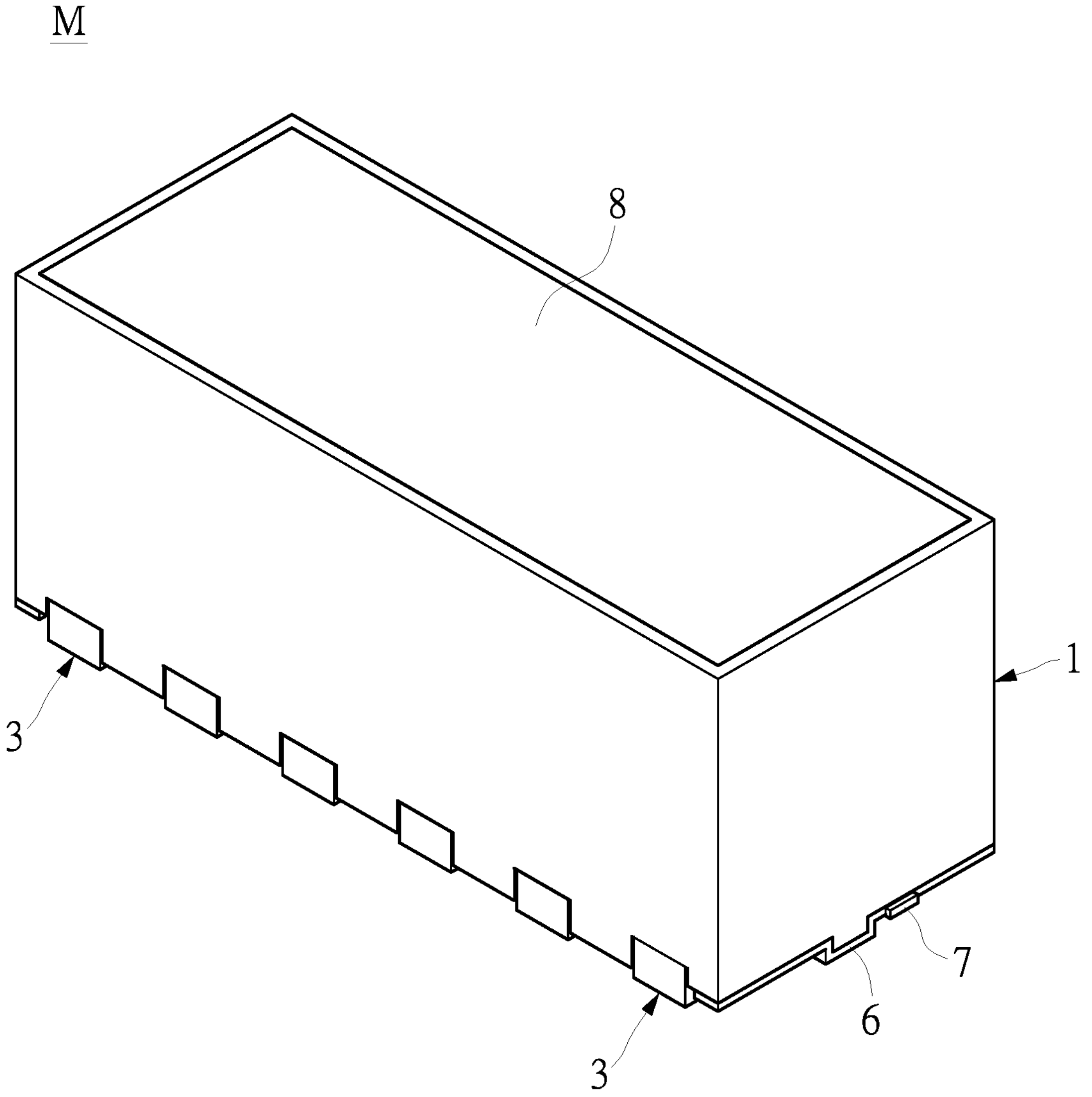
FIG. 1 is a first perspective schematic view of a multiphase inductor structure of the present disclosure.
Figure 2:
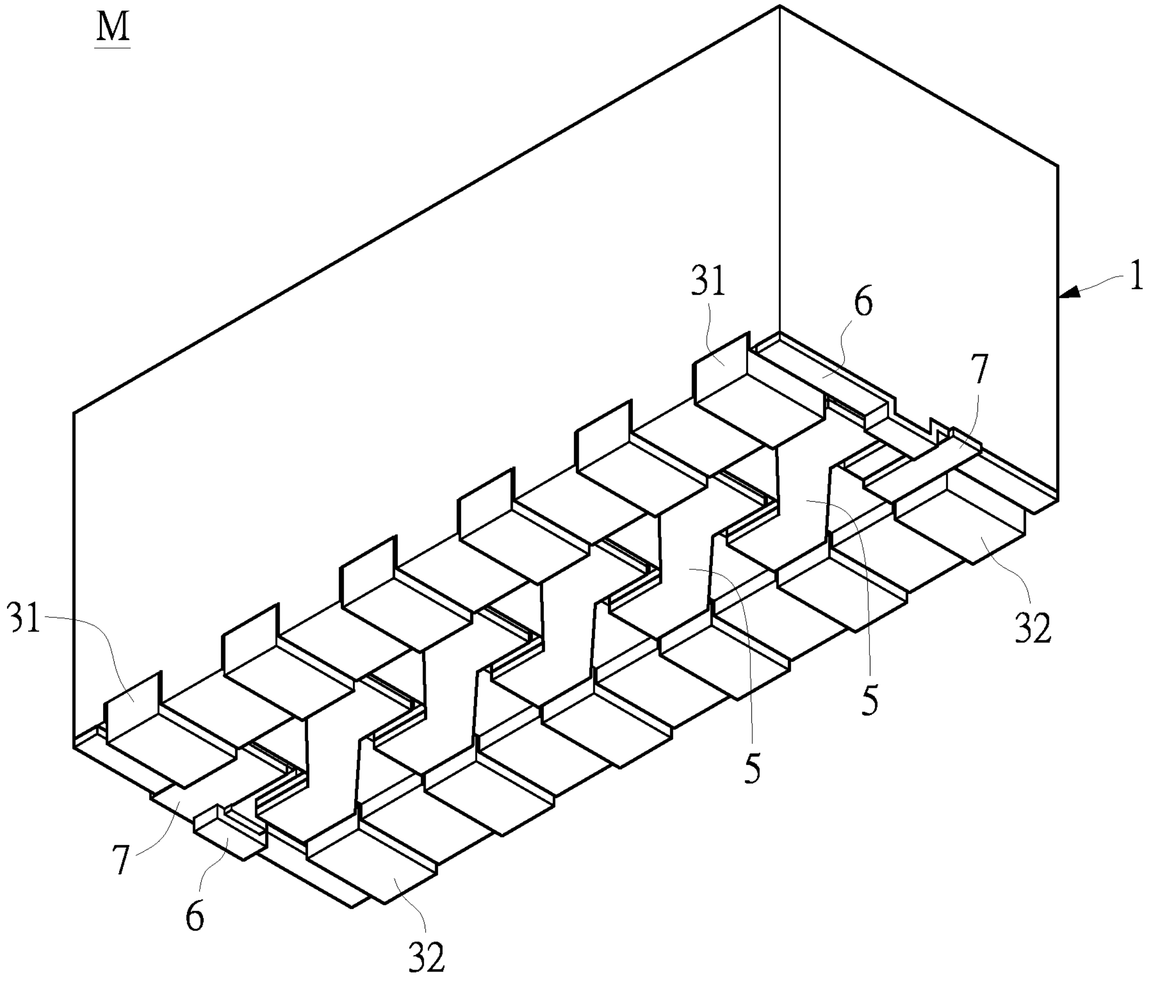
FIG. 2 is a second perspective schematic view of the multiphase inductor structure of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Embodiments

Figure 3:
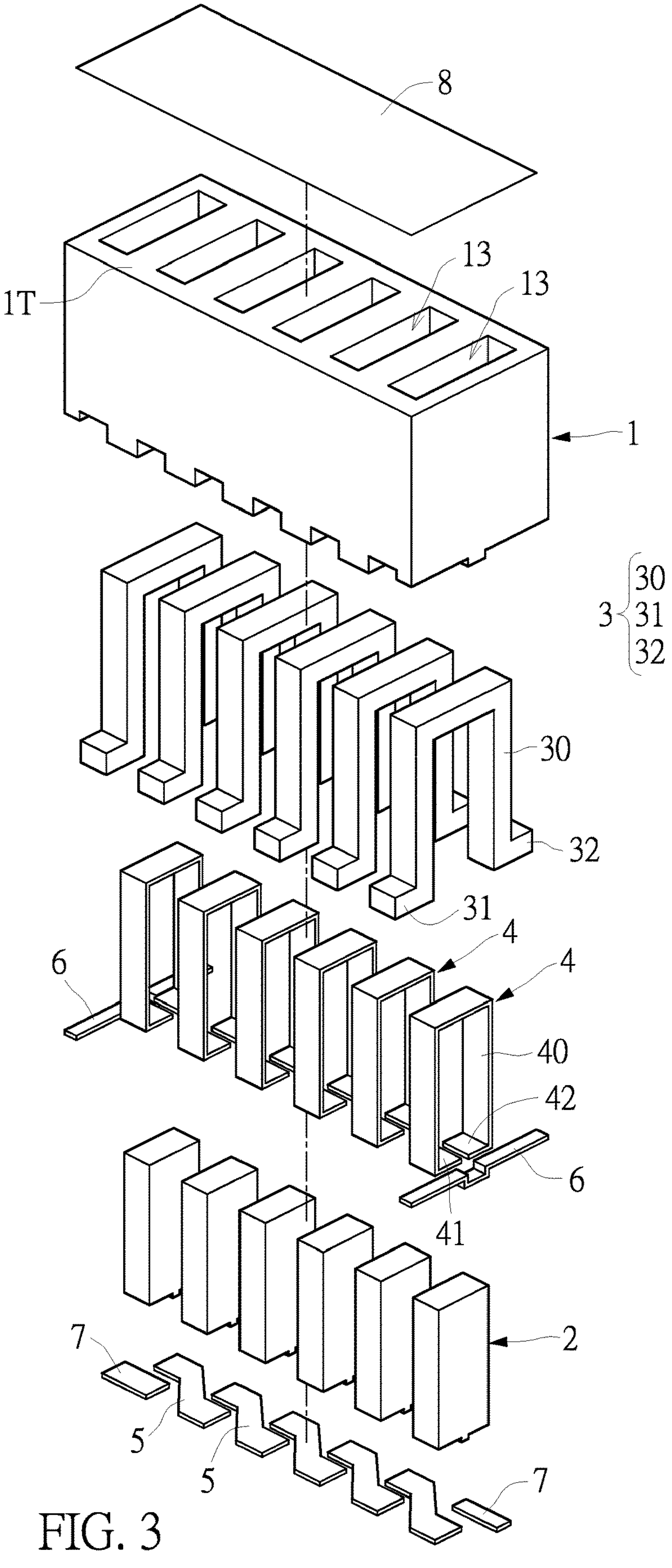
FIG. 3 is a first schematic exploded view of the multiphase inductor structure of the present disclosure.
Figure 4:
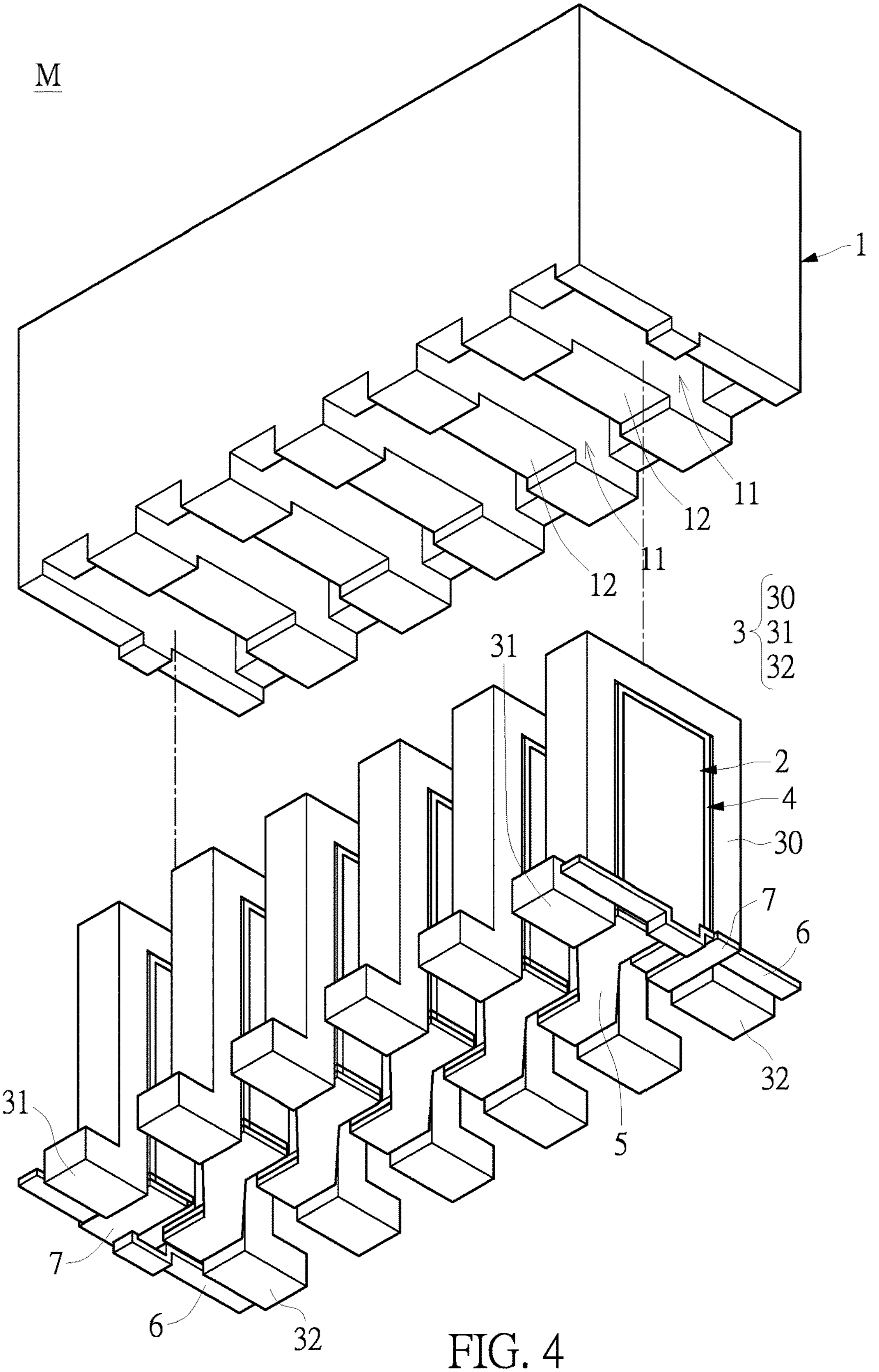
FIG. 4 is a second schematic exploded view of the multiphase inductor structure of the present disclosure.

Referring to FIG. 1 to FIG. 4, FIG. 1 and FIG. 2 are perspective schematic views from different angles of a multiphase inductor structure, and FIG. 3 and FIG. 4 are schematic exploded views of the multiphase inductor structure of the present disclosure. The present disclosure provides a multiphase inductor structure M, which includes a main magnetic core body 1, a plurality of secondary magnetic core bodies 2, a plurality of main coils 3, and a plurality of secondary coils.

According to the above, in the present embodiment, a number of each of the secondary magnetic core body 2, the main coil 3, and the secondary coil 4 is exemplarily six, but the present disclosure is not limited thereto. As shown in FIG. 4, the main magnetic core body 1 has a plurality of recesses 11, and an opening of each of the plurality of recesses 11 is oriented toward a bottom of the main magnetic core body 1. Similarly, a number of the recess 11 is exemplarily six, but the present disclosure is not limited thereto. A plurality of partition walls 12 each are formed between corresponding two of the plurality of recesses 11. The plurality of partition walls 12 correspondingly separate the plurality of recesses 11 from each other, so that the plurality of recesses 11 are not spatially communicated with each other. The plurality of secondary magnetic core bodies 2 are respectively disposed in the plurality of recesses 11, the plurality of main coils 3 are respectively disposed in the plurality of recesses 11 and respectively correspond to the plurality of secondary magnetic core bodies 2, and the plurality of secondary coils 4 are respectively disposed in the plurality of recesses 11 and respectively correspond to the plurality of main coils 3. In other words, in the present embodiment, each of the plurality of recesses 11 can accommodate one secondary magnetic core body 2, one main coil 3, and one secondary coil 4. Moreover, each of the plurality of main coils 3 is arranged between the main magnetic core body 1 and a corresponding one of the plurality of secondary coils 4, and each of the plurality of secondary coils 4 is arranged between a corresponding one of the plurality of main coils 3 and a corresponding one of the plurality of secondary magnetic core bodies 2. In addition, each of the plurality of main coils 3 has a body part 30, a first end par 31, and a second end part 32, and the first end part 31 and the second end part 32 are respectively connected to two ends of the body part 30 and extend in directions away from each other. The body part 30 is in a shape of an inverted U so as to form an accommodation space. Each of the plurality of secondary coils 4 has a body part 40, a third end part 41, and a fourth end part 42 and the third end part 41 and the fourth end part 42 are respectively connected to two ends of the body part 40 and extend in directions toward each other. The body part 40 is in a shape of an inverted U so as to form an accommodation space.

Therefore, the main coil can be, for example, in a shape of Ω, that is, the first end part 31 and the second end part 32 of each of the plurality of main coils 3 extend in the directions away from each other. The secondary coil 4 can be, for example, in a shape of C, that is, the third end part 41 and the fourth end part 42 of each of the plurality of secondary coils 4 extend in the directions toward each other. But the present disclosure is not limited the shape of the main coil 3 and the secondary coil 4. In addition, for example, each of the main coil 3 and the secondary coil 4 can be a flat coil formed by stamping and bending a metal member (for example, but not limited to, a copper sheet). However, the present disclosure is not limited to the formation of the main coil 3 and the secondary coil 4. In addition, a material of each of the main magnetic core body 1 and the secondary magnetic core body 2 can be ferrite or a soft magnetic material. However, the present disclosure is not limited to the materials of the main magnetic core body 1 and the secondary magnetic core body 2.

Figure 5:
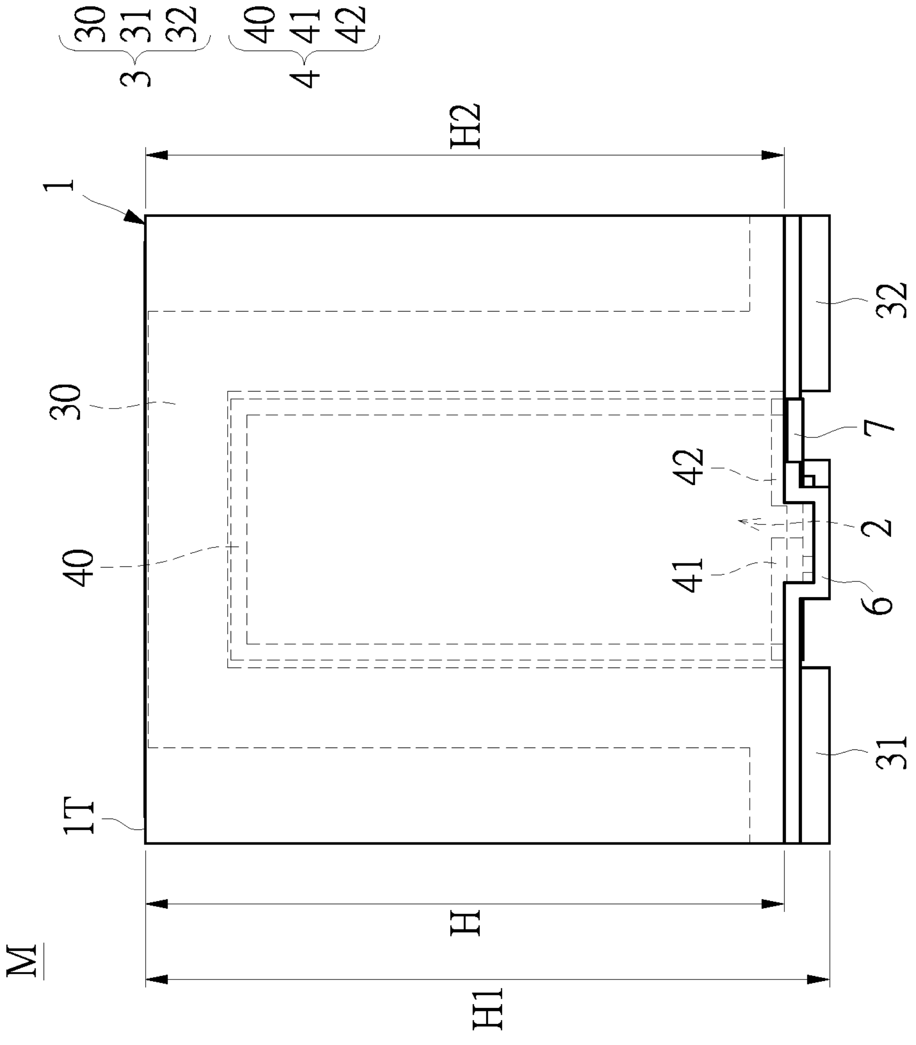
FIG. 5 is a schematic side view of the multiphase inductor structure of the present disclosure.

Referring to FIG. 4 and FIG. 5, FIG. 5 is a schematic side view of the multiphase inductor structure M of the present disclosure. When the plurality of secondary magnetic core bodies 2, the plurality of main coils 3, and the plurality of secondary coils 4 are correspondingly disposed in the plurality of recesses 11, in each of the plurality of recesses 11, the secondary coil 4 surrounds the secondary magnetic core body 2, and the main coil 3 surround the secondary coil 4 and the secondary magnetic core body 2. Therefore, in an assembly sequence, each of the plurality of main coils 3 is disposed in a corresponding one of the plurality of recesses 11 of the main magnetic core body 1, then the secondary coil 4 is disposed in the accommodation space formed by the body part 30 of the main coil 3, and then the secondary magnetic core body 2 is disposed in the accommodation space formed by the body part 40 of the secondary coil 4. However, it is worth mentioning that, each of the plurality of main coils 3 is electrically insulated from the corresponding one of the plurality of secondary coils 4, while the main magnetic core body 1 is not necessarily and electrically insulated from the plurality of main cores 3, and each of the plurality of secondary coils 4 is not necessarily and electrically insulated from the corresponding one of the plurality of secondary magnetic core bodies 2. In this way, in the present embodiment, among the main magnetic core body 1, six secondary magnetic core bodies 2, six main coils 3, and six secondary coils 4, the main magnetic core body 1 is coupled to a corresponding one of the secondary magnetic core bodies 2, a corresponding one of the main coils 3, and a corresponding one of the secondary coils 4 in each of the recesses 11 so as to form an inductor (i.e., each inductor includes one part of the main magnetic core body 1, one main coil 3, one secondary coil 4, and one secondary magnetic core body 2), and the plurality of inductors are not coupled to each other. Furthermore, the first end part 31 and the second end part 32 of the main coil 3, and the third end part 41 and the fourth end part 42 of the secondary coil 4 are exposed from the main magnetic core body 1, and more particularly from a bottom of the main magnetic core body 1. In addition, the first end part 31 and the second end part 32 of each of the main coils 3, and the third end part 41 and the fourth end part 42 of each of the secondary coils 4 are linearly arranged, but the present disclosure is not limited thereto. In another embodiment, the first end part 31, the second end part 32, the third end part 41, and the fourth end part 42 can also be not linearly arranged. The first end part 31 and the second end part 32 of the main coil 3, and the third end part 41 and the fourth end part 42 of the secondary coil 4 can be used as electrically conductive pads (or electrically conductive pins) of the multiphase inductor structure of the present disclosure that are electrically coupled to a printed circuit board (PCB). Accordingly, in the present embodiment, the six main coils 3 and the six secondary coils can form a total of twenty-four electrically conductive pads.

Referring to FIG. 3 and FIG. 4, the multiphase inductor structure provided by the present disclosure further includes at least one metal sheet 5. The at least one metal sheet 5 is used for connecting two of the plurality of secondary coils 4 that are adjacent to each other, and the at least one metal sheet 5 connects the third end part 41 of one of the two secondary coils 4 that are adjacent to each other to the fourth end part 42 of another one of the two secondary coils 4 that are adjacent to each other. The present disclosure does not limit a number of the metal sheet 5, and the number of the metal sheet 5 can be adjusted according to practical requirements. In the present embodiment, five metal sheets 5 are exemplarily used to connect six secondary coils 4. Moreover, in the present embodiment, the six secondary coils 4 can be defined from right to left as a first secondary coil 4, a second secondary coil 4, a third secondary coil 4, a fourth secondary coil 4, a fifth secondary coil 4, and a sixth secondary coil 4. The five metal sheets are similarly defined from right to left as a first metal sheet 5, a second metal sheet 5, a third metal sheet 5, a fourth metal sheet 5, and a fifth metal sheet 5. The first metal sheet 5 connects the third end part 41 of the first secondary coil 4 to the fourth end part 42 of the second secondary coil 4, the second metal sheet 5 connects the third end part 41 of the second secondary coil 4 to the fourth end part 42 of the third secondary coil 4, the third metal sheet 5 connects the third end part 41 of the third secondary coil 4 to the fourth end part 42 of the fourth secondary coil 4, the fourth metal sheet 5 connects the third end part 41 of the fourth secondary coil 4 to the fourth end part 42 of the fifth secondary coil 4, and the fifth metal sheet 5 connects the third end part 41 of the fifth secondary coil 4 to the fourth end part 42 of the sixth secondary coil 4.

Figure 6:
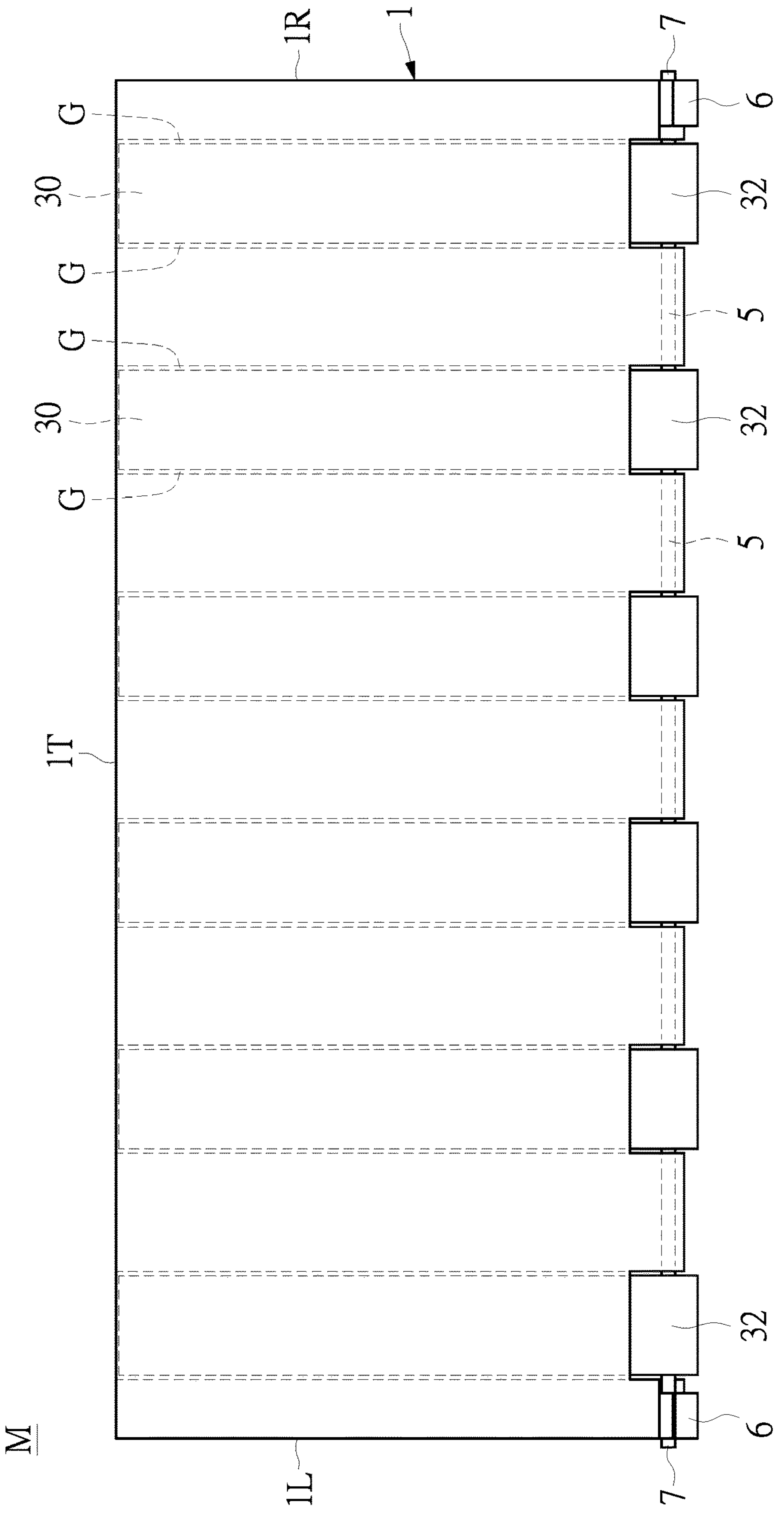
FIG. 6 is a schematic front view of the multiphase inductor structure of the present disclosure.

Furthermore, referring to FIG. 5 and FIG. 6, FIG. 6 is a schematic front view of the multiphase inductor structure of the present disclosure. The multiphase inductor structure M of the present disclosure further includes two first metal connectors 6 (i.e., terminals) and two second metal connectors 7 that respectively correspond to the two first metal connectors 6. As shown in FIG. 6, the two first metal connectors 6 are respectively disposed at two bottoms of the two side walls 1L, 1R of the main magnetic core body 1 that are opposite to each other. One of the two second metal connectors 7 is used for connecting a corresponding one of the two first metal connectors 6 to the third end part 41 of an adjacent one of the plurality of secondary coils 4, and another one of the two second metal connectors 7 is used for connecting another corresponding one of the two first metal connectors 6 to the fourth end part 42 of another adjacent one of the plurality of secondary coils 4. In this way, through a design of the second metal connectors 7, the electrically conductive pins (i.e., the electrically conductive pads) of a single coil component formed by the plurality of secondary coils 4 are correspondingly connected to the two bottoms of the two side walls 1L, 1R of the main magnetic core body 1, so that the multiphase inductor structure M can be directly coupled to the PCB through the first metal connectors 6 and the second metal connectors that serve as the electrically conductive pins. However, in another embodiment, the second metal connectors 7 can be used alone as the electrically conductive pins, that is, the first metal connectors 6 are used only for an auxiliary purpose. It is worth mentioning that, in the present disclosure, the six secondary coils 4, the five metal sheets 5, the two first metal connectors 6, and the two second metal connectors 7 can be assembled by various connection methods (e.g., welding, crimping, etc.), or integrally formed as a single component, so as to form the single coil component including the six secondary coils 4, the five metal sheets 5, the two first metal connectors 6, and the two second metal connectors 7 that are electrically connected to each other.

Furthermore, referring to FIG. 3, a top surface 1T of the main magnetic core body 1 further has a plurality of through holes 13, and the plurality of through holes 13 respectively correspond to and are connected to the plurality of recesses 11. The multiphase inductor structure M of the present disclosure can also include a cover 8 for covering the top surface 1T of the main magnetic core body 1. However, the present disclosure is not limited thereto.

Referring to FIG. 4 and FIG. 5, each of a bottom surface of the first end part of the main coil and a bottom surface of the second end part of the main coil projects from the main magnetic core body. That is, referring to FIG. 5, a distance H1 between the bottom surface of the first end part 31 or the second end part 32 of the main coil 3, and the top surface 1T of the main magnetic core body 1 is greater than a distance H between the top surface 1T of the main magnetic core body 1 and a bottom surface of one of the plurality of partition wall 12. In addition, each of a bottom surface of the third end part 41 of the secondary coil 4 and a bottom surface of the fourth end part 42 of the secondary coil 4 is higher than each of a bottom surface of the first end part 31 of the main coil 3 and a bottom surface of the second end part 32 of the main coil 3. That is, referring to FIG. 5, a distance H2 between the bottom surface of the third end part 41 or the fourth end part 42 of the secondary coil 4, and the top surface 1T of the main magnetic core body 1 is equal to the distance H between the top surface 1T of the main magnetic core body 1 and the bottom surface of one of the plurality of partition wall 12. In other words, the H1 between the bottom surface of the first end part 31 or the second end part 32 of the main coil 3, and the top surface 1T of the main magnetic core body 1 is greater than the H2 between the bottom surface of the third end part 41 or the fourth end part 42 of the secondary coil 4, and the top surface 1T of the main magnetic core body 1. In this way, although the first end part 31 and the second end part 32 of the main coil 3, and the third end part 41 and the fourth end part 42 of the secondary coil 4 are exposed from the main magnetic core body 1, a height difference is formed between the end parts of the main coil 3 and the end parts of the secondary coil 4 by unequal height therebetween. Conventionally, it is relatively difficult to form all the electrically conductive pads (or the electrically conductive pins) on the same plane in a multiphase inductor structure, and it is more difficult to couple all the electrically conductive pads to the PCB due to a large number of the electrically conductive pads and a tight arrangement thereof. Therefore, in the present disclosure, the height difference is formed between the end parts of the main coil 3 and the end parts of the secondary coil 4, by which the plurality of metal connectors 5 are disposed for being correspondingly and electrically connected to the third end parts 41 and the fourth end parts 42 of the plurality of secondary coils 4. In addition, the two second metal connectors 7 are connected the two sides of the multiphase inductor structure to expose the electrically conductive pins from the multiphase inductor structure, so that the multiphase inductor structure can be easily coupled to the PCB.

Furthermore, referring to FIG. 4 and FIG. 6, the main magnetic core body 1 and any one of the plurality of secondary magnetic core bodies 2 have a gap G arranged therebetween. It is worth mentioning that, the present disclosure does not limit a specific size of the gap G, and an inductance value caused by each of the plurality of inductors of the multiphase inductor structure M can be adjusted by changing the size of the gap G. In addition, it should be noted that, the present disclosure does not limit the way of forming the gap G. For example, two magnetic core bodies (i.e., the main magnetic core body 1 and any one of the plurality of secondary magnetic core bodies 2) can be directly separated from each other, i.e., air is used as an air gap. Alternatively, various non-magnetic materials, such as a mylar sheet, a kraft paper sheet, a plastic sheet, and a glass sheet, can be disposed between the two magnetic core bodies.

Beneficial Effects of the Embodiments

In conclusion, in the multiphase inductor structure provided by the present disclosure, by virtue of "the plurality of main coils 3 being respectively disposed in the plurality of recesses 11 and respectively corresponding to the plurality of secondary magnetic core bodies 4, and the plurality of secondary coils 4 being respectively disposed in the plurality of recesses 11 and respectively corresponding to the plurality of main coils 2" and "the main magnetic core body 1 being coupled to the corresponding one of the plurality of secondary magnetic core bodies 2, the corresponding one of the plurality of main coils 3, and the corresponding one of the plurality of secondary coils 4 in each of the plurality of recesses 11 to from the inductor, and the plurality of inductors being not coupled to each other," a multiphase inductor structure formed in a single structure is provided so as to achieve effects of reducing a volume and enhancing a power density.

Furthermore, the multiphase inductor structure M provided by the present disclosure is a multiphase inductor structure formed in a single structure. Therefore, the multiphase inductor structure M provided by the present disclosure is smaller than conventional multiphase inductor structures that include multiple ones of single inductor, and occupies less area on the PCB. In addition, since the conventional multiphase inductor structures include multiple ones of single inductor, heat generated by each single inductor during operation can only be dissipated through a structure thereof. In contrast, the multiphase inductor structure M provided by the present disclosure is formed in the single structure, so that heat generated when one inductor is operating can be dissipated through other inductor structures. That is, the multiphase inductor structure M provided by the present disclosure has a better heat dissipation effect than the conventional multiphase inductor structures that include multiple ones of single inductor.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A multiphase inductor structure, comprising:

a main magnetic core body having a plurality of recesses, wherein a plurality of partition walls each are formed between corresponding two of the plurality of recesses;

a plurality of secondary magnetic core bodies respectively disposed in the plurality of recesses;

a plurality of main coils respectively disposed in the plurality of recesses and respectively correspond to the plurality of secondary magnetic core bodies; wherein each of the plurality of main coils has a first end part and a second end part that extend in opposite directions, and the first end part and the second end part are exposed from the main magnetic core body;

a plurality of secondary coils respectively disposed in the plurality of recesses and respectively correspond to the plurality of main coils; wherein each of the plurality of secondary coils has a third end part and a fourth end part that extend in opposite directions, and the third end part and the fourth end part are exposed from the main magnetic core body; and at least one metal sheet for connecting two of the plurality of secondary coils that are adjacent to each other;

wherein each of the plurality of main coils is arranged between the main magnetic core body and a corresponding one of the plurality of secondary coils, and each of the plurality of secondary coils is arranged between a corresponding one of the plurality of main coils and a corresponding one of the plurality of secondary magnetic core bodies;

wherein the main magnetic core body is used for coupling a corresponding one of the plurality of secondary magnetic core bodies, a corresponding one of the plurality of main coils, and a corresponding one of the plurality of secondary coils in each of the plurality of recesses to from an inductor, and the plurality of inductors are not coupled to each other;

wherein a distance between a bottom surface of the third end part or the fourth end part of the secondary coil, and a top surface of the main magnetic core body is equal to a distance between the top surface of the main magnetic core body and a bottom surface of one of the plurality of partition walls;

wherein the at least one metal sheet connects the third end part of one of the two secondary coils that are adjacent to each other to the fourth end part of another one of the two secondary coils that are adjacent to each other.

2. The multiphase inductor structure according to claim 1, further comprising:

two first metal connectors; and two second metal connectors respectively corresponding to the two first metal connectors;

wherein the two first metal connectors are respectively disposed at two bottoms of two side walls of the main magnetic core body that are opposite to each other;

wherein one of the two second metal connectors is used for connecting a corresponding one of the two first metal connectors to the third end part of an adjacent one of the plurality of secondary coils, and another one of the two second metal connectors is used for connecting another corresponding one of the two first metal connectors to the fourth end part of another adjacent one of the plurality of secondary coils.

3. The multiphase inductor structure according to claim 1, wherein the top surface of the main magnetic core body has a plurality of through holes, and the plurality of through holes respectively correspond to and are spatially communicated with the plurality of recesses.

4. The multiphase inductor structure according to claim 1, wherein each of the plurality of main coils is electrically insulated from the corresponding one of the plurality of secondary coils.

5. The multiphase inductor structure according to claim 1, wherein the main magnetic core body and any one of the plurality of secondary magnetic core bodies have a gap arranged therebetween, and an inductance value caused by each of the plurality of inductors of the multiphase inductor structure is adjusted by changing a size of the gap.

6. The multiphase inductor structure according to claim 1, wherein each of a bottom surface of the first end part of the main coil and a bottom surface of the second end part of the main coil projects from the main magnetic core body.

7. The multiphase inductor structure according to claim 1, wherein each of the bottom surface of the third end part of the secondary coil and the bottom surface of the fourth end part of the secondary coil is higher than each of a bottom surface of the first end part of the main coil and a bottom surface of the second end part of the main coil.

8. The multiphase inductor structure according to claim 1, wherein the first end part and the second end part of each of the plurality of main coils, and the third end part and the fourth end part of the corresponding one of the plurality of secondary coils are linearly arranged.

9. The multiphase inductor structure according to claim 8, wherein the first end part and the second end part of each of the plurality of main coils extend in directions away from each other, and the third end part and the fourth end part of each of the plurality of secondary coils extend in directions away from each other.

* * * * *